United States Patent [19]
Dorward et al.

[11] Patent Number: 5,825,976
[45] Date of Patent: Oct. 20, 1998

[54] DEVICE AND METHOD FOR EFFICIENT UTILIZATION OF ALLOCATED TRANSMISSION MEDIUM BANDWIDTH

[75] Inventors: Sean Matthew Dorward, Somerville; Nuggehally Sampath Jayant, Gillette; James David Johnston, Warren; Schuyler Reynier Quackenbush, Westfield; Kenneth Lane Thompson, Watchung, all of N.J.

[73] Assignee: Lucent Technologies Inc., Murray Hill, N.J.

[21] Appl. No.: 634,538

[22] Filed: Apr. 18, 1996

Related U.S. Application Data

[63] Continuation of Ser. No. 552,152, Nov. 2, 1995, abandoned, which is a continuation of Ser. No. 167,711, Dec. 15, 1993, abandoned.

[51] Int. Cl.[6] .................................. G10L 3/00; G10L 9/00
[52] U.S. Cl. ............................................................. 395/2.38
[58] Field of Search .................................. 395/2.38, 2.39, 395/2.35, 2.36, 2.37, 2.19; 381/31, 2; 371/37.4, 37.1; 348/409

[56] References Cited

U.S. PATENT DOCUMENTS

| | | | |
|---|---|---|---|
| 4,912,763 | 3/1990 | Galand et al. | 381/31 |
| 4,941,152 | 7/1990 | Medan | 375/27 |
| 5,168,356 | 12/1992 | Acampora et al. | 348/409 |
| 5,172,380 | 12/1992 | Odaka | 371/37.4 |
| 5,367,608 | 11/1994 | Veldhuis et al. | 395/2.38 |

Primary Examiner—Allen R. MacDonald
Assistant Examiner—Patrick N. Edouard
Attorney, Agent, or Firm—Donald P. Dinella

[57] ABSTRACT

An independent transport layer is used as an error correction mechanism in a method employing perceptual audio coding. The transport layer is characterized by the addition of information, via a transport header, to each of a succession of blocks of encoded program material which is independent of the information within its respective block of encoded program material. The transport header comprises information on the structure of the block. Thus, the transport header is easily separated from the digital representation of the program material and is independent of the content of the digital representation thereby providing for changing of the content of the digital representation without changing the transport layer.

24 Claims, 3 Drawing Sheets

DEVICE AND METHOD FOR EFFICIENT UTILIZATION OF ALLOCATED TRANSMISSION MEDIUM BANDWIDTH

CROSS REFERENCE TO RELATED APPLICATIONS

This is a Continuation of U.S. patent application Ser. No. 08/552,152 filed on Nov. 2, 1995, now abandoned which was a Continuation of U.S. patent Application Ser. No. 08/167,711, filed Dec. 15, 1993, now abandoned.

FIELD OF THE INVENTION

The present invention relates to the efficient utilization of allocated bandwidth of a transmission medium by a signal representing, for example, a digital audio signal.

BACKGROUND OF THE INVENTION

One way to digitally encode an audio signal is to use perceptual audio coding (hereinafter "PAC"). For a given audio signal, a PAC system will produce a digital representation of the audio signal that, on average, is in more of a compressed form (i.e., represented by fewer bits) than a digital representation of the same audio signal produced by other known types of digital encoding.

There are many different types of PAC systems. However, the thread that is common to all PAC systems is the concept of not coding audio information that would be, when decoded, perceptually irrelevant (i.e., unable to be heard by a listener). This general concept is described in, for example, U.S. Pat. No. 5,341,457, entitled "Perceptual Coding of Audio Signals," by J. L. Hall and J. D. Johnston, filed Aug. 20, 1993, and issued on Aug. 23, 1994, hereby incorporated by reference. The amount of perceptually irrelevant information in an audio signal may vary greatly over time. On average, due to greater compression, a constant time portion of the audio signal with a lesser amount of perceptually relevant information requires fewer bits for a PAC system to encode than another constant time portion of the same audio signal with a larger amount of perceptually relevant information.

In any real-world system, some level of corruption of the digital data that is received at the far end of a transmission channel is inevitable. Data corruption can be accounted for by at least two different types of approaches. One approach encodes in such a way as to minimize the effects of the expected corruption. Another approach embeds information which is not a part of the digital representation of the program material per se. In either case, the recovery of desirable data/material and the invocation of the error recovery mechanism(s) are interdependent. Sometimes, the process of recovering the desirable data/material and the process of invoking the error recovery mechanism(s) are one in the same. In other instances, the invocation of the error recovery mechanism(s) must precede the start of the recovery of the desirable data/material. In the remaining situations, the start of the recovery of the desirable data/material must precede the invocation of the error recovery mechanism(s).

SUMMARY OF THE INVENTION

For many applications, interdependency of the recovery of the program material and the invocation of the error recovery mechanism(s) is neither desirable nor advantageous. Thus, the encoding of the desirable data/material and the introduction of error recovery mechanism(s) should be independent of each other.

To this end, in lieu of embedding information into the digital representation that becomes an inextricable part of the digital data, we have recognized it would be advantageous to use an independent transport layer as a signal transmission mechanism to reduce the effects of channel errors in a system employing perceptual audio coding. Transport layers, although generally known in the computer data communication art, have not been heretofore recognized as being able to be used advantageously in the program material-encoding context such as perceptual audio coding.

In accordance with the illustrative embodiment of the present invention, the transport layer is characterized by information which is combined with each of a succession of blocks of encoded program material, that information being independent of the information within its respective block of encoded program material. For example, a transport layer may be combined with a digital representation of an analog signal by using a transport header. The digital representation of the analog signal is divided into a set of digital blocks with each digital block having a particular structure. For each block in the set of digital blocks, the transport header is combined, e.g., concatenated, with the block, to form a transmittable block. The transport header comprises information about the structure of the transmittable block.

Advantageously, for storage as opposed to transmission, the transport header is easily separated from the digital representation of the signal. Thus, less memory is needed for storage than in the prior art arrangements in which information is embedded into the digital representation in such a way that it cannot be extracted therefrom.

Further, since the content of the transport layer, as represented by the transport header, is independent of the content of the digital representation of the signal, the content of the digital representation may be changed without changing the transport header.

In accordance with an embodiment of the invention, we define a difference between a number of bits available to perceptually encode a constant time portion of a first signal and a number of bits actually used to encode the first signal. The difference in bits is filled with other signals containing other information so that the allocated output bandwidth will be fully utilized. Other signals containing information, such as a second signal, "junk" data, or a combination of the two may be appropriately combined with the first signal to fill in bit positions in, for example, a digital output signal. The combination of the first and second signal form a so-called superblock to which the transport header is combined, thereby forming a transmittable block. As previously discussed, the transport header is independent of the content of the digital representation of the signal (e.g., the superblock) such that the content of the digital representation may be changed without changing the transport header.

Also, advantageously, a system in which the invention may be implemented uses additional error protection schemes that make the data transmission more robust to channel errors.

DETAILED DESCRIPTION

There are many systems in which the present invention may be implemented even though the remainder of the detailed description will be primarily devoted to how the invention may be implemented in a digital audio broadcast system (hereinafter "DAB"). Further, although much of the detailed description will be devoted to describing how to encode the digital output signal in the DAB system, those skilled in the art will realize that the invention encompasses other types of audio systems.

Prior to explaining the details of the invention, an overview of one environment in which the invention may be implemented (e.g., a DAB system) is useful.

Figure 1:
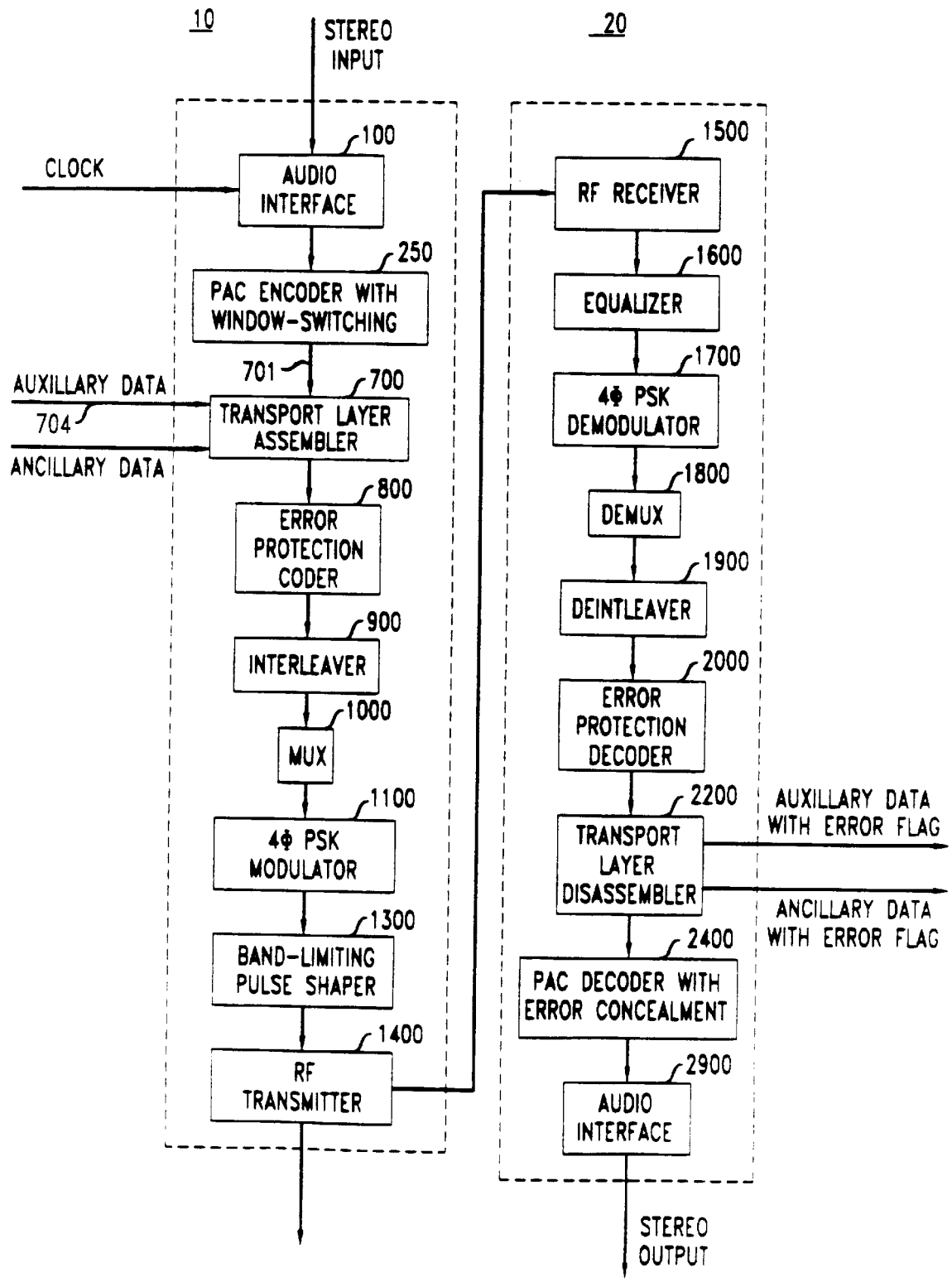
FIG. 1 shows a block diagram of a transmitter and a receiver of a digital audio broadcast system.

Referring to FIG. 1, a DAB system comprises a transmitter 10 and a receiver 20. Signals communicated from the transmitter 10 to the receiver 20 are transmitted in the terrestrial FM radio band (88–108 MHz).

More particularly, transmitter 10 comprises an audio interface 100, a perceptual audio encoder 250, a transport layer assembler 700, an error protection coder 800, an interleaver 900, a multiplexer 1000, a four-phase modulator 1100, a pulse shaper 1300, and an RF transmitter 1400. The receiver 20 comprises an RF receiver 1500, an equalizer 1600, a demodulator 1700, a demultiplexer 1800, a deinterleaver 1900, an error protection decoder 2000, a transport layer disassembler 2200, a PAC decoder with error concealment 2400, and an audio interface 2900.

The Transmitter

A stereo analog audio signal is applied to audio interface 100. Each audio channel of the stereo signal comprises nominally a 0–20 kHz audio signal. A clock signal is also provided as input. The interface converts each channel's audio signal to a digital signal by conventional analog-to-digital conversion techniques. In performing the conversion, the analog signals are sampled. Audio interface 100 produces digital stereo output signals conditioned for application to PAC coder 250 and eventual use by transport layer assembler 700.

The PAC coder codes the digital stereo output signals in a perceptual manner to generate a first signal 701. In an illustrative embodiment of the invention, we define a difference between a number of bits available to perceptually encode a constant time portion of a first signal and a number of bits actually used to encode the constant time portion of the first signal. Absent the insertion of additional bits, the bandwidth allocated output will not be fully utilized. Thus, the difference in bits is filled with other signals containing additional information.

More specifically, the first signal is comprised of a plurality of blocks, each representing a constant time portion of the first signal. The plurality of blocks is denoted with the subscript "i." Each block is assigned a predetermined number $N_i$, wherein $N_i$ is a maximum number of bits allowed to encode the $i^{th}$ block. However, since the block is encoded according to a perceptual coding technique, the number of bits actually used to encode the $i^{th}$ block, namely $NU_i$, may not utilize all $N_i$ bits allowed. $NA_i$ represents the number of bits that are filled or inserted into the $i^{th}$ block in order to fully utilize the bandwidth allocated to the $i^{th}$ block. $NA_i$ represents the difference between $N_i$ and $NU_i$.

Other signals containing information, such as a second signal, "junk" data, or a combination of the two, may be appropriately combined with the first signal to fill in areas in a digital output signal. The digital output signal is comprised of a plurality of filled in blocks, each of which may be called a "superblock." In other words, for each block, a superblock is formed. This results in a plurality of superblocks. If $NA_i$ is zero, the $i^{th}$ superblock and the $i^{th}$ block are identical. However, if $NA_i$ is not zero, $NA_i$ bits representative of the second signal, "junk" data, or a combination of the two are used, in conjunction with the $NU_i$ bits of the $i^{th}$ block, to form the $i^{th}$ superblock. Thus, the $i^{th}$ superblock always comprises $N_i$ bits.

Due to the variable nature of $N_i$, the $NA_i$ bits typically, but not always, represent asynchronous information. To the extent that bits representing the second signal (as opposed to junk data) are available, they will be used to fill in the needed $NA_i$ bits in the $i^{th}$ superblock. However, the system will fill in, with junk data, the portion of the $NA_i$ bits that are not used by bits representing the second signal. Thus, for a given superblock having a non-zero value for $NA_i$, the bits representing the second signal may vary from zero to $NA_i$.

The transport layer assembler 700 receives the first signal 701, e.g., a digital audio signal, from the audio interface 100 and a second signal 704, e.g., a auxiliary data signal from an asynchronous data signal source, and generates the digital output signal at a time invariant allocated output rate. Illustratively, this rate is 160 kilobits/second (kbps). This digital output signal comprises compressed audio information and auxiliary data. The transport layer assembler 700 also serves to add ancillary data at a rate of, e.g., 10 kbps to the 160 kbps time-invariant allocated output rate. Thus, the output rate from the transport layer assembler is 170 kbps.

Error protection coder 800 receives the digital signal provided by transport layer assembler 700 and applies an error protection code (i.e., a forward error correcting code) to that signal, as discussed below. Illustratively, the error protection code employed by coder 800 is a Reed-Solomon error protection code. As a result of applying the error protection code, the bit rate of the output from the coder 800 is greater than that of the input digital signal from the transport layer assembler 700. Illustratively, the bit rate of the output from the coder 800 is twice that of the input signal (340 kbps as compared to 170 kbps).

Interleaver 900 receives the output digital signal of the error protection coder 800 and interleaves bits of the digital signal to provide enhanced robustness against burst-like channel errors. The structure and operation of interleaver 900 are discussed below.

The output of interleaver 900 is a digital signal which is provided to a multiplexer 1000. Multiplexer 1000 is a conventional device which combines the output signal of interleaver 900 and with signals which accomplish framing, synchronization, and equalization.

The output of multiplexer 1000 is provided to a conventional four-phase PSK modulator 1100. The output of modulator 1100 is provided to conventional band-limiting, pulse shaping circuitry 1300. The signal generated by pulse shaping circuitry 1300 takes up a 200 kHz IF band. Pulse shaping circuitry 1300 generates a signal suitable for transmission by conventional RF transmitter 1400 (which includes an antenna not shown). Transmitter 1400 then transmits this signal over a predetermined 200 kHz band in the 88–108 MHz FM radio spectrum.

The Receiver

Referring again to FIG. 1, receiver 20 of the illustrative digital audio broadcast system comprises components which, in large part, accomplish the inverse of transmitter 10. RF receiver 1500 (which includes a receiving antenna not shown) receives a 200 kHz wide signal in the FM radio band (which signal was transmitted by transmitter 10) and generates a 200 kHz IF signal in conventional fashion. This 200 kHz signal is applied to a conventional equalizer 1600. The output of equalizer 1600 is provided to conventional four-phase PSK demodulator 1700 to produce a digital signal which comprises audio; auxiliary and ancillary data signals; and framing, synchronization, and equalization signals.

The digital signal from demodulator 1700 is provided to conventional demultiplexer 1800, which operates to remove from the digital signal the framing, synchronization, and equalization signals (which were added to the combined audio and data signal by multiplexer 1000 of transmitter 10).

The output of demultiplexer 1800 is therefore a digital audio and data signal. Because transmitter 10 employed interleaver 900 in generating a digital signal for transmission, receiver 20 employs a conventional complementary deinterleaver 1900 to provide the inverse operation to interleaver 900. The output of deinterleaver 1900 is thus a deinterleaved digital audio and data signal.

The output of the deinterleaver 1900 is provided to an error protection decoder 2000. Decoder 2000 performs the inverse operation of the Reed-Solomon error protection coder 800. This decoding reduces the bit rate of the digital audio and data signal. Illustratively, the bit rate is reduced from 340 kbps to 170 kbps. In addition, error protection decoder 2000 generates a block error flag in response to errors detected by the decoder 2000 itself and any other devices of the DAB system.

Both the decoded digital audio and data signal and the block error flag are provided to transport layer disassembler 2200 first. Transport layer disassembler 2200 performs the function of separating ancillary data signals and the block error flag from the balance of the output of the error protection decoder 2000—that is, the audio signals and the auxiliary data signals. Illustratively, the balance of decoder 2000 output is provided at a bit rate of 160 kbps.

The block error flag, the audio signals, and the auxiliary asynchronous data signals are provided to audio decoding system 2400. Assuming that no error flag is present, audio decoding system 2400 separates the auxiliary asynchronous data signals from audio signals. Thereafter, decoder system 2400 applies an audio decoding technique to produce uncompressed digital audio output signals. The uncompressed digital audio output signals are then made available to an audio interface 2900. Assuming the presence of a block error flag, an error concealment procedure is implemented by PAC decoder 2400 to mitigate against the effects of the block error.

Audio interface 2900 converts the digital audio output signals from audio decoding system 2400 into analog stereo signals suitable for use by conventional analog audio electronic equipment.

The overview discussion of the DAB system is now complete. We will now discuss the use of the transport layer assembler and transport layer in the illustrative DAB system.

Transport layer assembler

Figure 2:
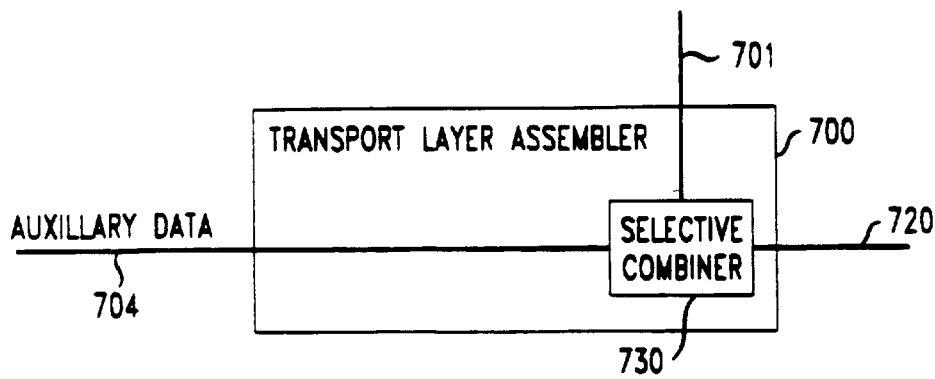
FIG. 2 shows a more detailed view of a transport layer assembler shown in FIG. 1 and the signals associated therewith.
Figure 3:
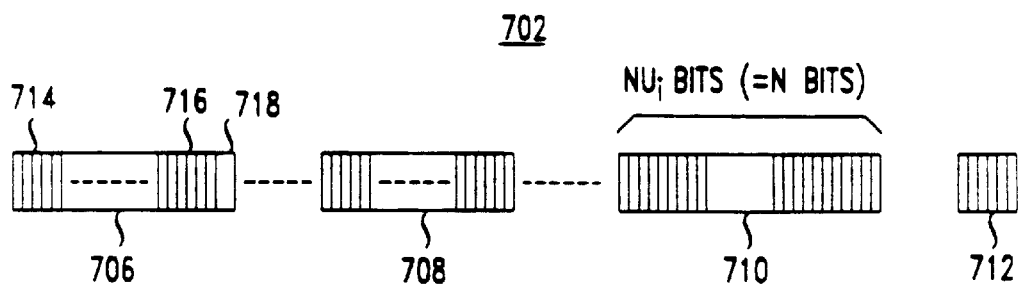
FIG. 3 shows a detailed view of a plurality of perceptually encoded blocks input into the transport layer assembler.

Referring to FIG. 2, in accordance with the illustrative embodiment of the invention, the transport layer assembler 700 receives a first signal 701. The transport layer assembler 700 also receives a second signal 704. Illustratively, the first signal 701 and the second signal 704 may be a perceptually encoded signal and an asynchronous signal, respectively. The perceptually encoded signal 701 may be encoded according to any one of a number of perceptual techniques in a perceptual encoder.

The perceptually encoded signal 701 is represented by a plurality of perceptually encoded blocks, 706, 708, 710, and 712. There are a number of bits, e.g., 714, 716, and 718, in each perceptually encoded block. Although perceptually encoded blocks 706–712 represent equal-duration portions of an analog signal, the number of bits in any two blocks is not necessarily the same. For example, the number of bits in block 712 is different than the number of bits the other blocks shown (706–710). This is because the time portions of the analog signal represented by blocks 706–712 differ in perceivable information content. Thus, a block with less perceivable information content, e.g., 712, may be encoded using fewer bits than a block with more perceivable information content, e.g., 706.

Figure 4:
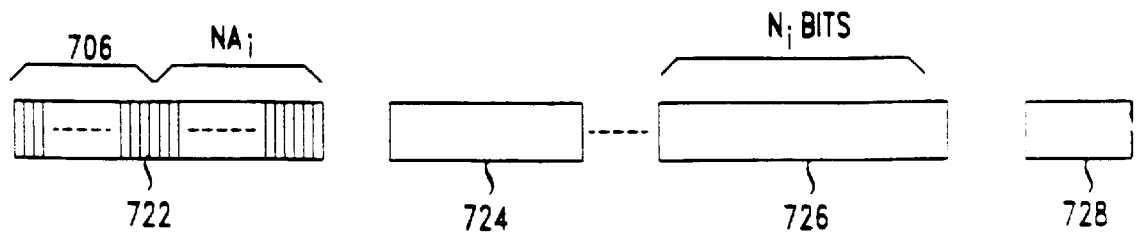
FIG. 4 shows a detailed view of a plurality of superblocks representing a digital output signal.

The asynchronous signal 704 is also represented digitally. The digital output signal 720 is comprised of blocks 722, 724, 726, and 728 which correspond to the combination of blocks 706, 708, 710, and 712 with the asynchronous data signal 704. The blocks (722–728) comprising the digital output signal 720 were produced in a selective combiner 730 (see FIG. 2) and may be referred to "superblocks" wherein each superblock is an $N_i$-bit output block. A plurality of superblocks 722–728 is shown in FIG. 4. The order of superblocks 722–728 is determined according to the time sequence in which the decoded blocks must be, e.g., "played" if the superblocks 722–728 represent, e.g., music or voice. This ensures that a listener at the receiver will be able to understand the decoded signal.

Essentially, the selective combiner 730 is used to generate a sequence of $N_i$-bit output blocks 722–728 each of which contain a respective one of the perceptually encoded blocks 706–712. Further, the selective combiner 730 operates such that at least one of the $N_i$-bit output blocks 722–728 comprises a portion of each of the plurality of superblocks 722–728.

The transport layer disassembler 2200 that is part of the receiver 20 performs the mirror image of the process that has been described above with reference to FIG. 2. More specifically, the transport layer disassembler 2200 functions to parse a received form of the digital output signal 720 into a received asynchronous signal and a received perceptually encoded blocks. Illustratively, the received perceptually encoded blocks represent an audio signal (e.g., music, voice, etc...) and the received asynchronous signal represents any type of information that is representable asynchronously (e.g., stock quotes, sports scores, the name/artist of a particular song, etc.)

Referring to FIG. 4, the digital output signal 720 is comprised of the plurality of superblocks or $N_i$-bit output blocks 722–728. Superblock 726 is comprised of only perceptually encoded block 710. Thus, as shown in FIG. 2, $NU_i$ equals $N_i$. Therefore, $NA_i$ corresponding to perceptually encoded block 708 is zero for superblock 726. Illustratively, however, most superblocks, e.g., 722, comprise a perceptually encoded block 706 and $NA_i$ bits representing information, such as the second signal, "junk" data, or a combination of the two. Although the $NA_i$ bits are shown as contiguous, it is apparent that they do not have to appear in that fashion in a given superblock.

We turn now more specifically to issues relating to the transport layer itself.

The transport layer

Figure 5:
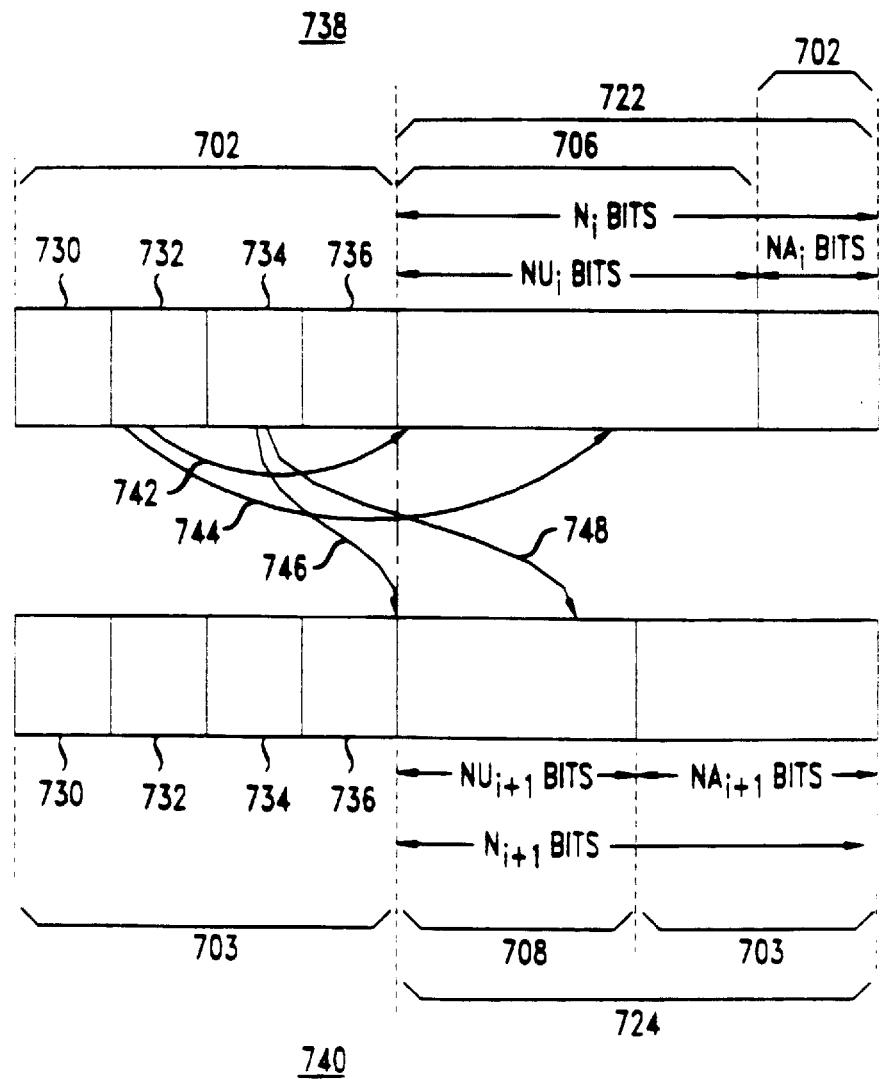
FIG. 5 shows an example of the plurality of superblocks after the transport header has been added to each superblock.

Referring briefly to FIG. 1, in accordance with the illustrative embodiment of the invention, the transport layer assembler 700 adds a transport layer via a transport header, e.g., 702, onto each superblock, e.g., 722 (see FIG. 5). A transport layer, e.g., 702, may be added to a digital representation of a analog signal wherein the digital representation comprises a set of digital blocks. Each digital block in the set of digital blocks has a particular structure and for each block in the set of blocks a transport header is combined therewith to form a transmittable block. The transport header comprises information on the structure of the block.

In accordance with the illustrative embodiment of the invention, the transport layer disassembler 2200 strips away the transport header 702 from the superblock 722. The effect of the transport layer assembler 700 and the transport layer disassembler 2200 will be shown for only two superblocks, e.g., 722 and 724. Although the transport layer assembler 700 forms a plurality of transmittable blocks (see reference numerals 738 and 740 of FIG. 5), for ease of understanding, the plurality of superblocks 722–728 was shown in FIG. 4 to include the addition of $NA_i$ bits where appropriate (e.g., superblock 722 but not superblock 726) which are part of the transport layer (see FIG. 5). However, FIG. 4 does not show the entire transport layer. Thus a "superblock" comprises perceptually encoded data and a portion of the transport layer whereas a "transmittable block" comprises perceptually encoded data and the entire transport layer.

Referring to FIG. 5, superblocks 722 and 724 are shown as being combined with other portions of the transport layer 702. As explained above, the $NA_i$ bits added to the plurality of superblocks 722–728 are part of the transport layer. The other portions of the transport layer 702 with which superblocks 722 and 724 are combined are: (1) a synchronization pattern 730; (2) a set of pointers to current important audio bits 732 for the current perceptually encoded block; (3) a set of pointers to future important audio bits 734 for the next perceptually encoded block; and (4) a set of ancillary data 736. It should be noted that the combination of superblocks 722 and 724 with transport layers 702 and 703, respectively, is not necessarily shown to scale in FIG. 5. The combinations result in transmittable blocks 738 and 740.

Advantageously, for storage as opposed to transmission, the transport layer, as represented by the transport header, is easily separated from the digital representation. Thus, less memory is needed for storage (i.e., one stores only the digital representation instead of the digital representation with embedded information). Further, since the transport layer is independent of the content of the digital representation, one can change the content of the digital representation without changing the transport layer.

Referring yet again to FIG. 5, the synchronization pattern 730, the set of pointers to current important audio bits 732 for the current perceptually encoded block, the set of pointers to future important audio bits 734 for the next perceptually encoded block, and the set of ancillary data 736 typically does not change in bit length and location from transmittable block to transmittable block (e.g., from 738 to 740). Thus, reference numerals 730, 732, 734, and 736 will be used to show these features for both transmittable blocks 738 and 740. However, illustratively, the only exception to the typical case occurs if the set of ancillary data 736 does not yield transmittable blocks having an integer number of bits or bytes. In this case, the set of ancillary data 736 varies by a bit or a byte in order to provide an exact average rate of the ancillary data input into the transport layer assembler 700 as shown in FIG. 1.

Referring again to FIG. 5, the synchronization pattern 730 provides a recognizable bit pattern that signifies the beginning of each transmittable block, e.g., 738. The set of pointers to current important audio bits 732 points to: (1) the perceptually encoded block's 706 first bit via line 742; and (2) the perceptually encoded block's 706 first bit of a second channel (e.g., the "left" and/or "difference" channel) via line 744. Also, the set of pointers to current important audio bits 732 describes the location and amount of the auxiliary data in transmittable block 738. The set of pointers to future important audio bits 734 points to: (1) the perceptually encoded block's 708 first bit via line 746; and (2) the perceptually encoded block's 708 first bit of a second channel (e.g., the "left" and/or "difference" channel) via line 748. Also, the set of pointers to future important audio bits 734 describes the location and amount of the auxiliary data in transmittable block 740. Finally, the set of ancillary data 736 comprises bits that signify the amount of ancillary data followed by the ancillary data itself. The synchronization pattern 730 for transmittable block 740 contains the same type of information and thus, does not require a detailed discussion. However, it should be noted that the pointers in transport layer 703 will point to places in transmittable blocks "i+1" and "i+2" as opposed to blocks "i" and "i+1."

The transport layer 702 has been referred to as including the ancillary and auxiliary data. What is meant by this is that the transport layer incorporates the ancillary and auxiliary data into the transmittable block.

We turn now to another aspect of the function and operation of the system of FIG. 1.

The error protection system

Referring again to FIG. 1, illustratively, the DAB system use an error protection system comprising a number of subsystems. Some subsystems are in the transmitter 10 and some are in the receiver 20.

Referring for the most part to FIGS. 1 and 5, a first layer of error protection is exploited by the transport layer assembler 700. Essentially, the transport layer assembler 700 relates to error protection in that it adds the synchronization pattern 730. Also, the transport layer assembler adds the set of pointers to future important audio bits 734 pointing to audio bits in the future transmittable block, e.g., the next block, via lines 746 and 748 shown in FIG. 5 and also adds the set of pointers to current important audio bits 734 pointing to audio bits in the current transmittable block. More specifically, the pointers provide entry points into the PAC bit stream 701 where bit parsing may be started. This enables the transport layer disassembler 2200 to identify and typically correct errors in the pointers to the set of both current (734) and future important audio bits 736.

A second layer of error protection is implemented in the transmitter 10 of FIG. 1 by the error protection coder 800. The second layer is, illustratively, a Reed-Solomon coder.

Referring to the receiver of FIG. 1, a first layer of error protection is implemented by the error protection decoder 2000. The first layer performs the inverse function of the second layer of error protection implemented in the transmitter 10 and is, illustratively, a Reed-Solomon decoder. The Reed-Solomon decoder also generates an error flag if it is unable to successfully correct errors in a Reed-Solomon data block.

A second layer of error protection is implemented in the transport layer disassembler 2200. The second layer performs the inverse function of the first layer of error protection implemented in the transmitter 10 and, illustratively, replaces any corrupted data in the set of pointers to current important audio bits 734 by using the uncorrupted data in the set of pointers to future important audio bits 736. If both sets of pointers are corrupted, the transport layer disassembler 2200 mutes the receiver's 20 output.

A third layer of error protection is also implemented by the transport layer disassembler 2200. The third layer of error protection may be described as functioning to conceal errors.

The manner in which the third layer conceals errors may be performed in a variety of manners. Although the third layer, and how it corrects errors, will be described with respect to a two- channel (e.g., a left channel and a right channel) coding system, the concepts of how to correct errors are readily extendible to multichannel systems (e.g., 5 channels) and to other two channel systems (e.g., a sum channel and a difference channel).

As mentioned above, one function of the receiver's 20 first layer is to identify the location, if any, of errors and generate an error flag where appropriate. The third layer can determine, based upon the error flag, which information is intact and which must be discarded. This error flag is used by the second layer to determine if alternate information from the second layer (e.g., pointers to future important audio bits) is necessary in order to perform the decoding or synchronizing functions, and what part of the perceptually encoded audio data, auxiliary data, or ancillary data is impaired.

Once the impaired, e.g., corrupted, information is identified, the third layer is activated if the perceptually encoded audio data is in fact impaired. In the case that the third level is activated, several strategies may be used, depending on the previous history of errors and the region of impaired data within the perceptually encoded audio data.

The most severe action happens if there was an error in the previous perceptually encoded audio data and there is an error in the current perceptually encoded audio data. In this case, the decoder output is muted, and kept muted until a predetermined number of unimpaired and decoded blocks is counted, with no intervening errors.

However, if there is no error in the previous audio block but there is error in the current audio block, information from either the current audio block or previous audio block is substituted in order to maintain audio signal integrity to the greatest extent possible. If the previous audio block would provide a better representation of the missing data, based upon a comparison of uncorrupted parts of the current block and the previous block, at least a portion of the previous audio block is used to substitute for the corrupted data. Otherwise, uncorrupted data from the current audio block is used.

The foregoing merely illustrates the principles of the present invention. Those skilled in the art will be able to devise numerous alternative arrangements which, although not explicitly shown or described herein, embody those principles and are thus within the spirit and scope of the invention as defined in the appended claims.

We claim:

1. A method comprising the steps of:

receiving a signal;

encoding at least a portion of said signal into a sequence of encoded blocks using a perceptual encoding method; and for each encoded block of said sequence of encoded blocks, generating a transmittable block by combining a transport header with said encoded block, the content of said transport header being independent of the content of said encoded block, and said transport header containing a first set of pointers identifying a first one of said encoded blocks and a second set of pointers identifying a second one of said encoded blocks.

2. The method of claim 1 wherein said signal represents program material capable of human perception.

3. The method of claim 1 wherein said transport header includes information on the structure of said transmittable block.

4. The method of claim 1 wherein said transport header comprises:

a synchronization pattern signifying the beginning of said transmittable block; and a set of ancillary data.

5. A method comprising the steps of:

(a) generating a first digital signal representing a perceptual stimulus, said first digital signal comprising a sequence of time blocks;

(b) receiving a second digital signal;

(c) for each time block in said sequence of time blocks:

(1) encoding said time block using a perceptual encoding method; and (2) generating an output block comprising said encoded time block and a portion of said second digital signal; and (d) combining said output block with a transport header to form a transmittable block, the content of said transport header being independent of the content of said output block, and said transport header containing a first set of pointers identifying a first one of said encoded time blocks and a second set of pointers identifying a second one of said encoded time blocks.

6. The method of claim 5 wherein said perceptual stimulus is an audio signal.

7. The method of claim 5 wherein said perceptual encoding method includes selecting noise threshold values based upon noise masking criteria and using said selected noise threshold values to control the coarseness of quantizing during said encoding.

8. The method of claim 5 wherein said transport header includes information on the structure of said transmittable block.

9. A method of forming a digital output signal comprising:

inputting a signal into a selective combiner, said signal being encoded according to a perceptual encoding method to generate a set of encoded blocks, each encoded block being represented by a number of bits, $NU_i$, the number of bits being variable from encoded block to encoded block and being less than or equal to a respective predetermined number $N_i$; and outputting a digital output signal from said selective combiner, said digital output signal comprising a set of transmittable blocks, each transmittable block of said set of transmittable blocks being formed by the combination of (1) a respective one superblock from a set of superblocks, each said superblock in said set of superblocks comprising a respective one encoded block, represented by said number of bits $NU_i$, from said set of encoded blocks and a number of bits of a digital signal which is less than or equal to the difference between $N_i$ and $NU_i$, with (2) a respective one transport header from a set of transport headers, the content of each said transport header being independent of the content of said superblock being combined therewith, and each said transport header containing a first set of pointers identifying particular bits from said number of bits, $NU_j$, of a first one of said encoded blocks and a second set of pointers identifying particular bits from said number of bits, $NU_j$, of a second one of said encoded blocks.

10. The method of claim 9 wherein said transport header includes information on the structure of said transmittable block.

11. A method comprising the steps of:

(a) receiving a first digital signal representing a signal capable of being perceived by a human;

(b) encoding said first digital signal into a sequence of encoded blocks using a perceptual encoding method;

(c) representing each encoded block in said sequence of encoded blocks by a number of bits, $NU_i$, less than or equal to a predetermined number $N_i$, wherein $N_i$ is a maximum number of bits for encoding the $i^{th}$ encoded block;

(d) receiving a second signal;

(e) for each said encoded block, generating an $N_i$-bit output block comprising said encoded block and a portion of said second signal comprising no more than $NA_i$ bits, wherein $NA_i$ represents the difference between $N_i$ and $NU_i$; and (f) combining said $N_i$-bit output block with a transport header to form a transmittable block, the content of said transport header being separate from the content of said $N_i$-bit output block, and said transport header containing a first set of pointers identifying particular bits from said number of bits, $NU_j$, of a first one of said encoded blocks and a second set of pointers identifying particular bits from said number of bits, $NU_j$, of a second one of said encoded blocks.

12. The method of claim 11 wherein said transport header includes information on the structure of said transmittable block.

13. A transmitter for transmitting a digital output signal comprising:

an input for receiving an audio signal;

an encoder for encoding said audio signal into a plurality of encoded blocks using a perceptual encoding method; and a transport layer assembler for outputting said digital output signal, said digital output signal comprising a plurality of transmittable blocks, each said transmittable block being generated by combining a transport header with an individual encoded block of said plurality of encoded blocks, the content of said transport header being independent of the content of said individual encoded block, and said transport header containing a first set of pointers identifying a first one of said encoded blocks and a second set of pointers identifying a second one of said encoded blocks.

14. The transmitter of claim 13 wherein said transport header comprises:

a synchronization pattern signifying the beginning of said transmittable block; and a set of ancillary data.

15. The method of claim 9 or 11 in which said transport header comprises:

a synchronization pattern signifying the beginning of said transmittable block; and a set of ancillary data.

16. An apparatus for use in transmitting a digital output signal comprising:

a transport layer assembler for receiving a first digital signal and second digital signal, said first digital signal being encoded according to a perceptual encoding method to generate a plurality of encoded blocks, each encoded block being represented by a number of bits, $NU_i$, the number of bits being variable from encoded block to encoded block and being no more than a respective predetermined number $N_i$; and means for transmitting said digital output signal, said digital output signal comprising a plurality of transmittable blocks, each transmittable block of said plurality of transmittable blocks being formed by the combination of (1) a respective one superblock from a plurality of superblocks, each said superblock in said plurality of superblocks comprising a respective one encoded block, represented by said number of bits $NU_i$, from said set of encoded blocks and a number of bits of said second digital signal which is less than or equal to the difference between $N_i$ and $NU_i$, with (2) a respective one transport header from a plurality of transport of headers, the content of each transport header being separate from the content of said superblock being combined therewith, and each said transport header containing a first set of pointers identifying particular bits from said number of bits, $NU_j$, of a first one of said encoded blocks and a second set of pointers identifying particular bits from said number of bits, $NU_j$, of a second one of said encoded blocks.

17. The apparatus of claim 16 wherein each said transport header includes information on the structure of said transmittable block.

18. The apparatus of claim 16, wherein said transport header comprises:

a synchronization pattern signifying the beginning of said transmittable block; and a set of ancillary data.

19. An arrangement for use in a receiver which receives intelligence communicated to said receiver by a transmitter, said transmitter including (a) means for receiving an input signal; (b) means for encoding at least a portion of said input signal into a sequence of encoded blocks using a perceptual encoding method; (c) means for outputting a digital output signal, said digital output signal comprising a set of transmittable blocks, each transmittable block of said set of transmittable blocks being formed by combining a transport header with one of said encoded blocks, the content of said transport header being independent of the content of said one encoded block, and said transport header containing a first set of pointers identifying a first one of said encoded blocks and a second set of pointers identifying a second one of said encoded blocks; and (d) means for communicating said digital output signal to said receiver over a communication channel, said arrangement comprising:

means for receiving said digital output signal from said communication channel; and means for decoding said digital output signal to recover said input signal.

20. The apparatus of claim 19 wherein each said transport header includes information on the structure of said transmittable block.

21. The apparatus of claim 19 wherein each said transport header comprises:

a synchronization pattern signifying the beginning of said transmittable block; and a set of ancillary data.

22. An arrangement for use in a receiver which receives intelligence communicated to said receiver by a transmitter, said transmitter including (a) a transport layer assembler for receiving a first digital signal and second digital signal, said first digital signal being encoded according to a perceptual encoding method to generate a plurality of encoded blocks, each encoded block being represented by a number of bits, $NU_i$, the number of bits being variable from encoded block to encoded block and being no more than a respective predetermined number $N_i$; (b) means for outputting a digital output signal, said digital output signal comprising a plurality of transmittable blocks, each transmittable block of said plurality of transmittable blocks being formed by the combination of (1) a respective one superblock from a plurality of superblocks, each said superblock in said plurality of superblocks comprising a respective one encoded block, represented by said number of bits $NU_i$, from said set of encoded blocks and a number of bits of said second digital signal which is less than or equal to the difference between $N_i$ and $NU_i$, with (2) a respective one transport header from a plurality of transport of headers, the content of each transport header being independent of the content of said superblock being combined therewith, and each said transport header containing a first set of pointers identifying particular bits from said number of bits, $NU_i$, of a first one of said encoded blocks and a second set of pointers identifying particular bits from said number of bits, $NU_j$, of a second one of said encoded blocks; and (c) means for communicating said digital output signal to said receiver over a communication channel, said arrangement comprising:

means for receiving said digital output signal from said communication channel; and means for decoding said digital output signal to recover said first digital signal and said second digital signal.

23. The apparatus of claim 22 wherein each said transport header includes information on the structure of said transmittable block.

24. The apparatus of claim 22 wherein each said transport header comprises:

a synchronization pattern signifying the beginning of said transmittable block; and a set of ancillary data.

* * * * *